Patented June 30, 1942

2,288,118

UNITED STATES PATENT OFFICE 2,288,118

METHOD OF PREPARING SODA CRACKERS AND COMPOSITION THEREFOR

Edwin A. Vaupel, Chicago Heights, Ill., assignor to Victor Chemical Works, a corporation of Illinois No Drawing. Application October 5, 1939, Serial No. 298,113

10 Claims. (Cl. 99—91)

This invention relates to an improved method for preparing soda crackers and a composition suitable for such purpose.

At the present time the established practice in preparing soda crackers is to form a mixture of a considerable proportion of the total flour required, generally about two-thirds, with yeast and a small amount of water. This mixture is permitted to ferment for about 18 hours to form a "sponge." The remainder of the flour is then added to the sponge together with additional water, salt, and an amount of sodium bicarbonate which is estimated to be sufficient to neutralize the acids in the flour and those which have resulted from the fermentation. This mixture is then allowed to ferment for another 5 hours to produce a relatively stiff dough. The dough is rolled into sheets, docked, and baked for 3 to 6 minutes, depending upon the temperature employed in the oven.

At the present time there is no good method of estimating the amount of soda required in the final dough. Cracker bakers generally rely upon experience, in judging from the "feel," aroma, and temperature of the sponge, the proper quantity of sodium bicarbonate needed. Various methods for analytical control had been suggested but had not been generally employed because of inaccuracies which necessarily arise therein.

Nevertheless, the rule of thumb method now employed leaves much to be desired and the pH value of crackers varies quite widely. For example, a group of seven different crackers found on the market showed variations in pH value from 6.62 to 8.25. These departures from the desired range of 7.0 to 7.5 are quite undesirable. They affect the crispness, color, tenderness and taste of the cracker. Crackers of low pH value are tough, slightly heavy and have a slightly acid taste. On the other hand, crackers of high pH value have an undesirable greenish yellow color and a slightly soapy taste.

It is a rather surprising phenomenon that very minute differences in the amount of soda can cause great differences in the final pH value. Similarly, soda cracker doughs, before baking, which show very slight differences in pH, may produce extreme variations of pH in the baked cracker. This abnormal shift in pH value occurs only when an excess of soda is employed over that required to neutralize the acids of the sponge and dough. It is possibly due to the decomposition of excess sodium bicarbonate under certain conditions during baking to liberate carbonic acid and leave highly alkaline sodium carbonate.

It has now been discovered that the difficulties due to improper estimation of the amount of sodium bicarbonate required may be greatly minimized or eliminated by including in the dough a suitable salt of a volatile alkali. This salt may be that of any reasonably strong acid with any volatile alkali, such as ammonia. For example, diammonium phosphate, mono-ammonium phosphate, ammonium sulphate, and ammonium chloride may be satisfactorily employed. Apparently, during the baking the excess sodium bicarbonate reacts with the ammonium salt, thereby liberating and expelling both ammonia and carbon dioxide, leaving in the cracker a sodium salt of lower pH value than the sodium carbonate which would otherwise apparently result.

As an example of a procedure employing the improved method, a sponge was made up by mixing 120 parts of flour, 1 part yeast, and 50 parts of water and mixed until the dough hung together. This mix was then allowed to ferment for 18 hours at a temperature of about 80° F. to form a "sponge." The final dough was prepared by adding to this "sponge" 80 parts of flour, 22 parts of shortening, 2 parts salt, 22 parts of water, and varying amounts of soda and diammonium phosphate. After mixing for about 5 minutes in a mechanical mixer the dough was allowed to ferment for about 5 hours, then rolled out, docked, and baked for approximately 4 to 5 minutes in an oven heated to 500° F. The following table shows the effect on the pH value of the baked cracker of varying amounts of soda and soda-diammonium phosphate mixtures:

TABLE I (Crackers baked 4-5 min. at 500° C.)

| Amount of soda added per cent (based on flour wt.) | Added diammonium phosphate based on soda (by weight) | | | |
|---|---|---|---|---|
| | None, pH | 25% $(NH_4)_2HPO_4$, pH | 33⅓% $(NH_4)_2HPO_4$, pH | 50% $(NH_4)_2HPO_4$, pH |
| 0 | 5.0 | 5.0 | 5.0 | 5.0 |
| 0.2 | 6.05 | 6.13 | 5.98 | 5.80 |
| 0.3 | 6.65 | 6.65 | 6.50 | 6.23 |
| 0.4 | 7.80 | 7.09 | 6.80 | 6.55 |
| 0.6 | 9.20 | 8.08 | 7.43 | 6.95 |
| 0.8 | 9.55 | | 8.15 | 7.2 |

The following Table II shows the results of similar tests, differing only in that other ammonium salts were employed:

TABLE II

| Amount of soda added percent (based on flour wt.) | Added ammonium salt in terms of weight of soda | | |
|---|---|---|---|
| | 29.8% $(NH_4)H_2PO_4$, pH | 33⅓% $(NH_4)_2SO_4$, pH | 33⅓% $NH_4Cl$, pH |
| 0 | 5.17 | 5.07 | 5.17 |
| 0.1 | 5.50 | 5.42 | 5.50 |
| 0.2 | 6.00 | 5.88 | 5.93 |
| 0.3 | 6.43 | 6.28 | 6.30 |
| 0.4 | 6.77 | 6.65 | 6.63 |
| 0.5 | 7.12 | 6.92 | 6.98 |
| 0.6 | 7.50 | 7.27 | 7.18 |
| 0.7 | 7.80 | 7.63 | 7.47 |

The pH values given in this table were determined on the finished cracker after baking for approximately 4½ minutes at 500° F.

Abnormally high pH values were obtained with soda alone when the amount of soda exceeded 0.4% whereas, in the cases where the buffering agent was added, considerably larger amounts of soda may be employed without resulting in a cracker of undesirably high pH value. In Table I it is seen that variations in the control of the cracker pH value may be obtained by changing the relative proportions of soda and buffering agent.

In another series of tests employing soda and soda plus buffering agents the crackers were baked for varying lengths of time in order to show the effect of baking time on the pH of the resulting crackers, and to demonstrate the effectiveness of the buffering agent in pH control when an excess of soda is employed. The following table gives the results of this series of tests:

TABLE III

*Effect of baking time on the pH of soda crackers*

| | Time (min.) | | | | | | | |
|---|---|---|---|---|---|---|---|---|
| | 0 | 1 | 2 | 3 | 4 | 5 | 6 | 7 |
| No soda | 4.58 | | 4.70 | | 4.75 | | 4.78 | |
| 0.475% soda | 6.97 | 8.65 | 8.64 | 8.60 | 8.57 | 8.45 | 8.30 | 7.86 |
| 0.60% soda / 0.20% $(NH_4)_2HPO_4$ | 7.13 | 8.15 | 7.70 | 7.52 | 7.43 | 7.37 | 7.35 | 7.25 |
| 0.60% soda / 0.18% $(NH_4)H_2PO_4$ | 6.90 | 7.80 | 7.54 | 7.38 | 7.33 | 7.34 | 7.28 | 7.25 |
| 0.60% soda / 0.20% $(NH_4)_2SO_4$ | 7.35 | 8.50 | 8.10 | 7.50 | 7.40 | 7.31 | 7.23 | 7.18 |
| 0.60% soda / 0.20% $NH_4Cl$ | 7.15 | 8.34 | 7.88 | 7.53 | 7.02 | 7.00 | 6.82 | 6.70 |
| 0.25% soda | 5.95 | | 6.05 | | 6.05 | | 6.05 | |
| 0.625% soda / 0.187% $(NH_4)_2HPO_4$ | 7.02 | | 7.51 | | 7.40 | | 7.28 | |

From these data it may be observed that where soda alone is employed in a deficient amount, for example, 0.25%, no substantial change in pH value occurs at different baking times. The crackers in this case were heavy, tough, and had an undesirable acid taste. On increasing the soda to 0.475% it will be noted that pH values above 8.0 were obtained in the crackers baked for 2 to 6 minutes. These crackers had a greenish yellow color and had a slightly soapy taste. Where ammonium salts were added with the soda, it will be observed that relatively small variations in the pH value occurred even when large amounts of soda were employed. In all of the above tests the 5, 6 and 7 minute baking periods were included only for the purpose of showing the effect of over-baking on the pH value, since all of the crackers in such cases were burned to some extent. The crackers baked under the ammonium salt buffered conditions for 3 to 5 minutes were of excellent quality, light in color, and of crisp, flaky character.

The total amount of soda and buffering agent necessary to add to the cracker dough will of course depend on the type of flour used and the fermenting conditions for the "sponge" and dough. Generally in large scale commercial bakeries a flour containing about 0.5% ash content is employed and the "sponge" based on a mix of several barrels of flour. Under these conditions fermentation and the development of acidity proceeds further than in the laboratory batches described above; consequently a higher level of soda is required.

The procedure to be followed in commercial cracker bakeries is to determine by the usual known methods the approximate amount of soda required, then add a reasonably large excess of soda together with an appreciable proportion of the buffering agent. For example, a large commercial cracker "sponge" having a pH value of 5.0 was divided into two equal portions. To one portion 9 lbs. of soda were added and to the other portion 10½ lbs. of soda and 2½ lbs. of diammonium phosphate were added, together with the other necessary ingredients in equal amounts. After fermenting these doughs for 5 hours the unbaked cracker blanks had pH values of 7.12 and 7.58 respectively. After baking for 3½ minutes at about 500° F. the finished crackers showed pH values of 7.72 and 7.3 respectively. The buffered lower pH value baked cracker was of much lighter color and had a more desirable taste and appearance than the unbuffered cracker.

While the control of the pH value of the baked cracker may be varied by regulating the proportions of soda and buffering agent, it is preferred to limit the proportion of the buffering agent in such manner that an adequate buffering capacity is obtained without the necessity of having to employ excessively large amounts of soda. For example, as shown in the first table above, if we employ soda and diammonium phosphate in the ratio of 2 to 1, it will be necessary to employ substantially twice as much soda as when the ratio is 4 to 1. If the ratio of diammonium phosphate is increased to much over one-half of the amount of soda employed, excessively large amounts of the reagents will be required to produce crackers of neutral reaction. Therefore, it is advisable, when using diammonium phosphate as the buffering agent, to employ an amount less than the amount of soda, preferably not substantially more than half of the amount of the soda, and at the same time it is preferred not to employ substantially less than 25% of the ammonium salt. The pH of the ammonium salt employed should not be less than 4.0.

What I claim as new, and desire to secure by Letters Patent, is:

1. In the manufacture of soda crackers from a dough in which the leavening action is supplied by yeast and in which soda is added to overcome acid produced by the yeast, the step of adding to the dough sodium bicarbonate and an ammonium salt of a strong acid in an amount not substantially more than 50% by weight of the bicarbonate and not substantially less than 25% by weight of the bicarbonate.

2. The method of making soda crackers which comprises preparing a fermented cracker sponge in which the leavening action is supplied by yeast and in which soda is added to overcome acid produced by the yeast, adding shortening, salt, additional flour, water and a predetermined amount of sodium bicarbonate together with an amount of an ammonium salt of a strong acid physically equivalent to approximately 25 to 33% of the weight of the sodium bicarbonate, and fermenting the resulting dough mixture for several hours, forming the dough into desired shapes and baking.

3. In the preparation of soda crackers in which a sponge dough is prepared and is later augmented and fermented before baking, and in which the leavening action is supplied by yeast and in which soda is added to overcome acid produced by the yeast, the method of controlling the ultimate pH value of the resulting crackers within the pH range 7.0–7.5 which comprises adding to the sponge, bicarbonate of soda in excess sufficient to provide in the absence of a buffering agent a pH value in the baked cracker over 8.0 together with an ammonium salt of a strong acid in proportions to produce a cracker within the pH range of 7.0–7.5.

4. The method as set forth in claim 3 in which the bicarbonate of soda and ammonium salt are added in proportions to produce a baked cracker having a pH between approximately 7.0 and 7.5.

5. The method as set forth in claim 3, in which the buffering agent is an ammonium salt of a strong inorganic acid.

6. The method as set forth in claim 3, in which the buffering agent is diammonium phosphate.

7. The method as set forth in claim 3, in which the buffering agent is mono-ammonium phosphate.

8. The method as set forth in claim 3, in which the buffering agent is ammonium sulfate.

9. The method as set forth in claim 3, in which the buffering agent is added in an amount less than the amount of soda added.

10. A cracker dough improving composition consisting essentially of sodium bicarbonate and diammonium phosphate, the amount of diammonium phosphate being not substantially more than 50% and not substantially less than 25% by weight of the sodium bicarbonate.

EDWIN A. VAUPEL.